United States Patent [19]
Wen

[11] Patent Number: 5,345,059
[45] Date of Patent: Sep. 6, 1994

[54] TEMPERATURE SELF-REGULATING, ELECTRICALLY-HEATED SPOON

[76] Inventor: Shih-Hsien Wen, No. 2 Alley 62, Lane 205 Sec. 6 Chunghwa Road, Hsinchu City, Taiwan

[21] Appl. No.: 101,542

[22] Filed: Aug. 2, 1993

[51] Int. Cl.$^5$ .................. H05B 1/02; H05B 3/14; H05B 1/00; A47J 43/28
[52] U.S. Cl. ...................... 219/227; 30/140; 219/228; 219/240; 219/505; 219/523; 425/276
[58] Field of Search .............. 219/227, 221, 240, 241, 219/523, 505, 544, 237, 228; 30/140; 425/276

[56] References Cited

U.S. PATENT DOCUMENTS

| | | | |
|---|---|---|---|
| 1,323,523 | 12/1919 | Cox | 219/227 |
| 1,477,631 | 12/1923 | Deenihan | 219/227 X |
| 1,974,051 | 9/1934 | Kelly | 219/228 X |
| 2,114,703 | 4/1938 | Conner | 219/227 X |
| 2,533,947 | 12/1950 | Lipnicki et al. | 219/227 X |
| 3,518,407 | 6/1970 | Andrich | 219/241 |
| 3,584,190 | 6/1971 | Marcoux | 219/241 X |
| 3,886,345 | 5/1975 | Baisch | 219/227 |
| 4,005,310 | 1/1977 | Baisch | 219/227 |
| 4,034,489 | 7/1977 | Hughes | 219/240 X |
| 4,468,555 | 8/1984 | Adachi et al. | 219/237 |

FOREIGN PATENT DOCUMENTS

| | | | |
|---|---|---|---|
| 349279 | 2/1922 | Fed. Rep. of Germany | 219/523 |
| 813288 | 9/1951 | Fed. Rep. of Germany | 219/228 |

Primary Examiner—Anthony Bartis
Attorney, Agent, or Firm—Poms, Smith, Lande & Rose

[57] ABSTRACT

An electrically-heated spoon including a flat heating device made of a plate-like positive temperature coefficient (PTC) resistor having a periphery side wall of the spoon mounted to the periphery and a handle of the spoon extending from the side wall. A pair of conductive wires in electrical connection with the heating device are embedded in the handle and extend out of a remote end of the handle to define an external connector for connection to an external power source. The plate-like positive temperature coefficient resistor is sandwiched between two insulating plates and then encased by two opposite metal casing members with the conductive wires, which are connected to the resistor, extending through openings formed on the casing members for connection to a power source.

16 Claims, 4 Drawing Sheets

TEMPERATURE SELF-REGULATING, ELECTRICALLY-HEATED SPOON

BACKGROUND OF THE INVENTION

The present invention relates to electrically-heated spoons.

Electrically-heated spoons are typically placed in a container, such as a bowl, to heat liquid food, such as milk or soup, in the container. The spoons generally comprise a spoon body on which a flat heating device is mounted to heat the liquid food and a handle extending from the spoon body to be held by the person who is using the spoon. The spoon is commonly called an electrical spoon as it uses electricity which flows through the electrical heating filaments inside the spoon body to generate heat for heating the liquid in which the spoon body is immersed.

Conventional electrical spoons generally comprise a handle on which an electrical heating device is mounted to be disposed into the liquid food to be heated so that when the electricity is supplied to the device, heat is generated on the surface of the device to heat the liquid food within which the device is placed. In this way, liquid food, such as water, milk and soup, can be heated and cooked.

The conventional electrical spoon, however, has no thermostat or temperature regulator incorporated therein. Thus, when it is heating liquid food without being carefully watched, overheating or overcooking may result thereby damaging the electrical spoon or causing a fire. Further, since no power control device is provided in the conventional electrical spoon, when an electrical spoon that is generating heat is accidently placed on a desk or table, a fire can result.

It is therefore desirable to provide an electrical spoon having a temperature regulator incorporated therein so as to control the temperature generated thereby within a pre-determined range to avoid the dangers of fire and property damage.

SUMMARY OF THE INVENTION

It is therefore the principal objective of the present invention to provide an electrically-heated spoon having a flat heating device constituted by a positive temperature coefficient (PTC) resistor to control the temperature of the heater within a pre-determined range so as to avoid overheating and thus a potential fire catastrophe.

It is also an objective of the present invention to provide an electrically-heated spoon which, when not in electrical connection with a power source, can be used as a regular spoon.

To achieve the above objectives, there is provided an electrically-heated spoon comprising a flat heating device made of a plate-like positive temperature coefficient resistor having a periphery with a side wall of the spoon mounted thereto and a handle of the spoon extending from the side wall. A pair of conductive wires in electrical connection with the heating device are embedded in the handle and extend out of a remote end of the handle to define an external connector for connection to an external power source. The plate-like positive temperature coefficient resistor device is sandwiched between a pair of opposing insulating plates and then encased by two opposing metal casing members, The conductive wires which are connected to the resistor extend through openings formed in the casing members,

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
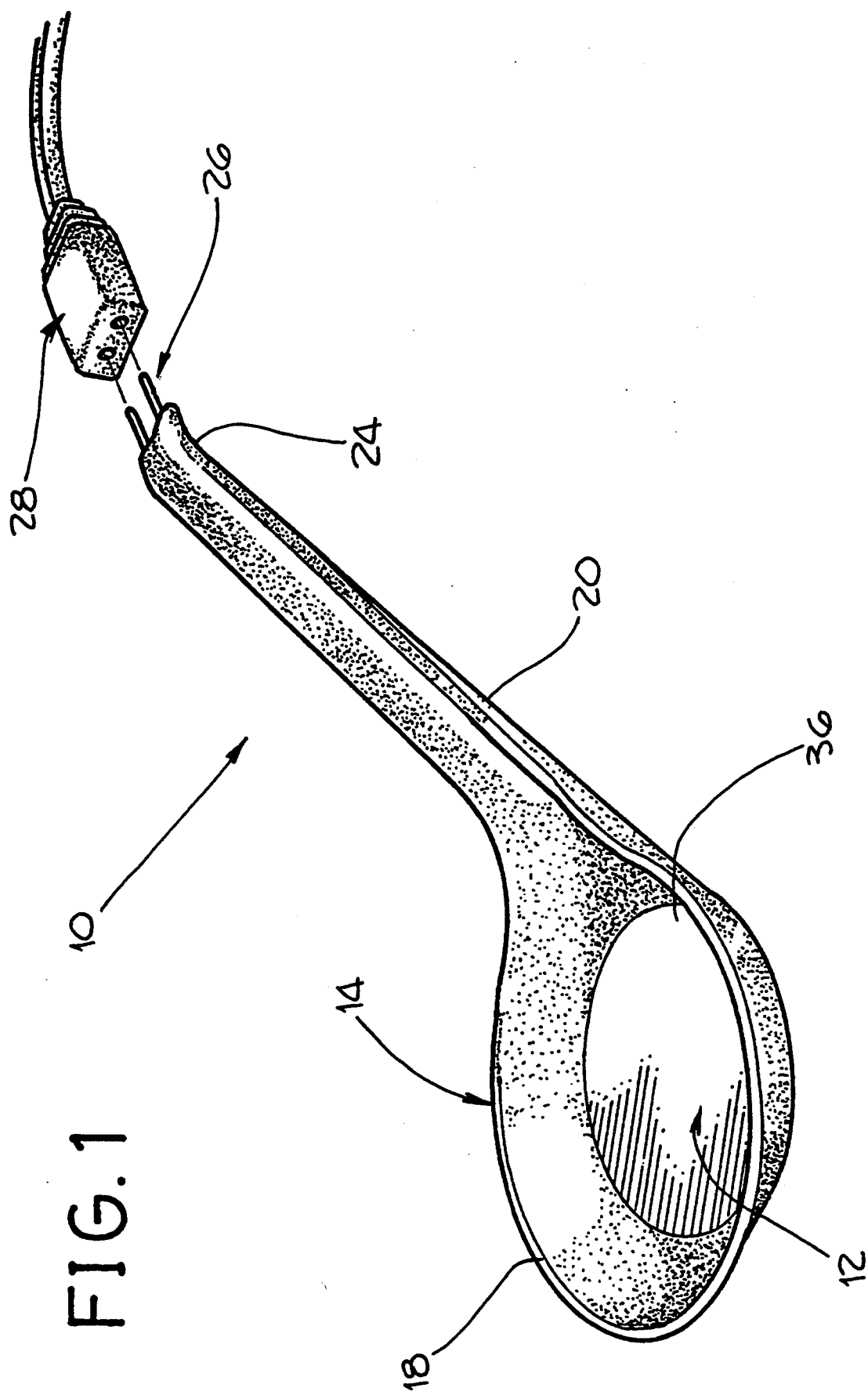
FIG. 1 is a perspective view of an electrically-heated spoon constructed in accordance with the present invention.
Figure 2:
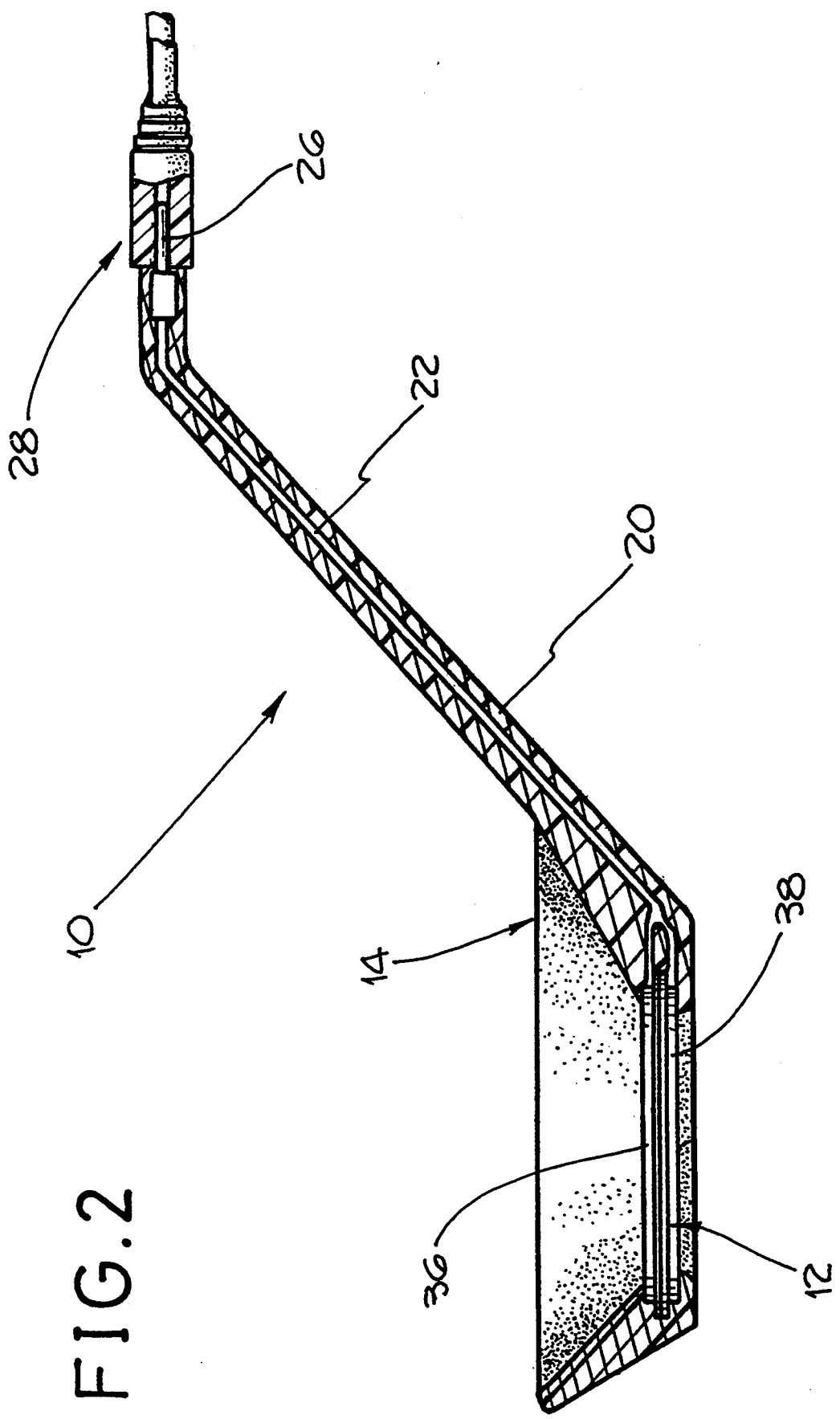
FIG. 2 is a longitudinal sectional view of the spoon of FIG. 1.

With reference to the drawings and in particular to FIGS. 1 and 2, an electrically-heated spoon of the present invention is shown generally by reference numeral 10, Electrically-heated spoon 10 comprises a flat electrical heating device 12 partially surrounded by an enclosure 14 to form a spoon shape with the heating device mounted forming the bottom of the spoon, and a portion 36 of which is, exposed. The enclosure 14 has a C-shaped section which surrounds a periphery of the heating device 12 and forms the side wall 18 of the spoon 10. The enclosure 14 extends a distance below the lowermost surface 38 of the heating device 12 and also forms a handle 20 of the spoon extending from the side wall 18.

Conductive wiring shown generally at 22 is in electrical connection with the heating device 12 and is embedded in the handle 20. It extends out of the handle 20 from a remote end 24 thereof to provide connecting plug members 26 thereon, A corresponding socket 28 for electrically connecting to an external power source (not shown) is provided to engage the plug members 26 for applying electricity to the heating device 12 via the conductive wiring 22. Preferably, the enclosure 14 is made of a temperature resistive and electrical insulating material, such as temperature resistive plastics. Further, the conductive wiring 22 is preferably rigid to assist in the formation, such as by injection molding, of the enclosure 14 and the handle 20.

Figure 3:
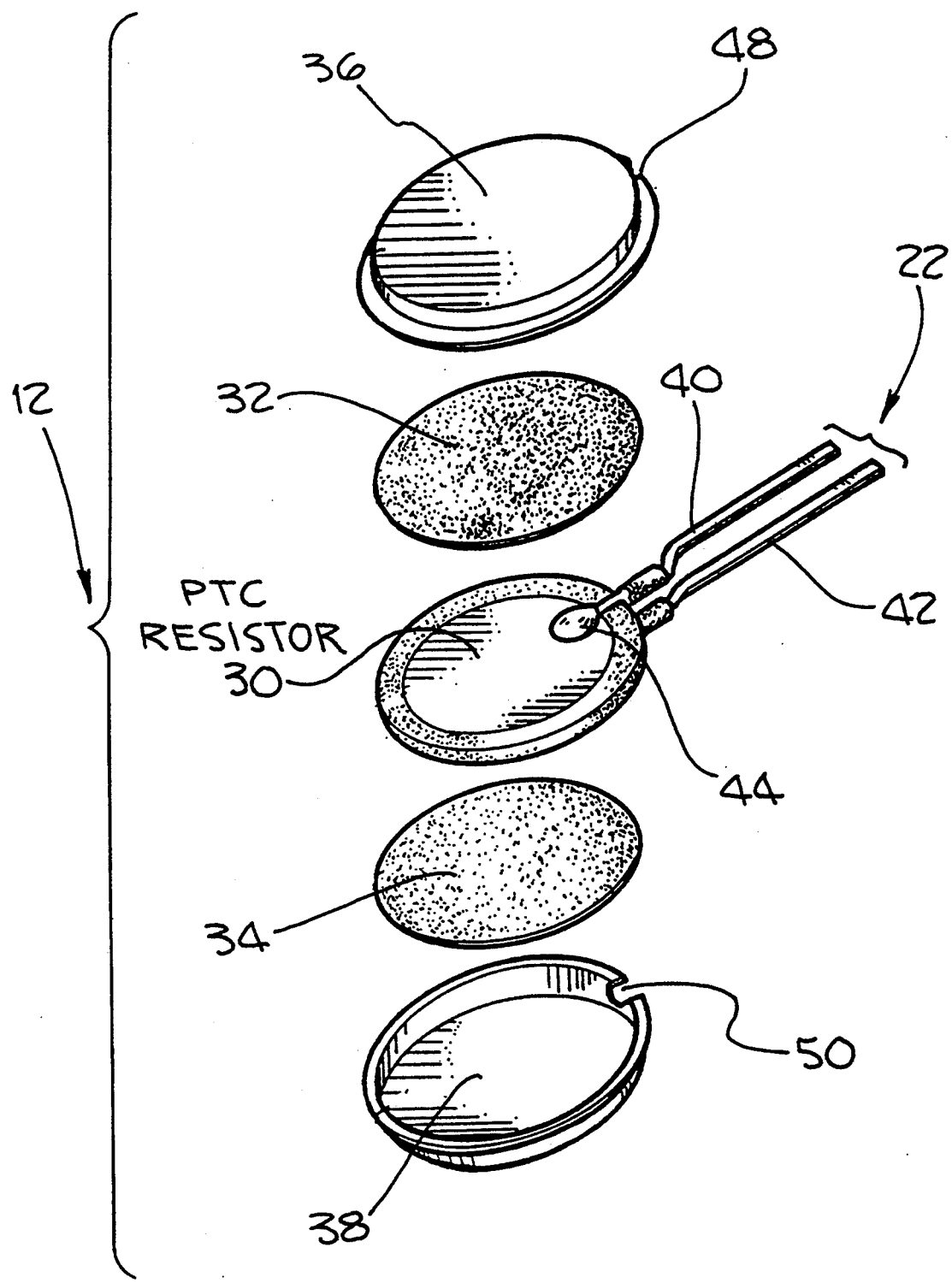
FIG. 3 is an exploded view of the heating device of the spoon of FIG. 1.
Figure 4:
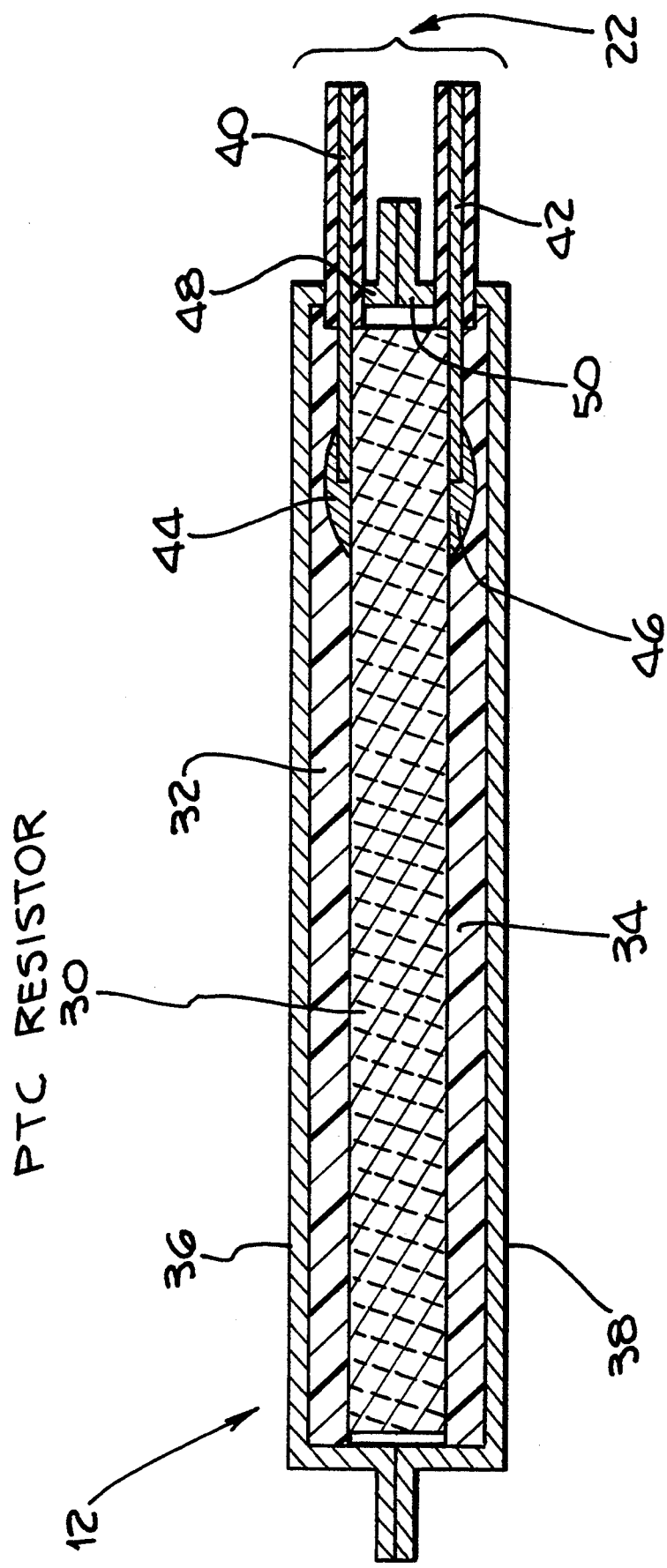
FIG. 4 is a cross-sectional view of the heating device of FIG. 3.

Further referring to FIGS. 3 and 4, the heating device 12 is a flat plate-like member, comprising a positive temperature coefficient (PTC) resistor 30, such as that made of $BaTiO_3$, in the form of a plate sandwiched between two insulating plates 32 and 34. The plate-like resistor 30 and the insulating plates 32 and 34 are encased by two opposing heat conductive casing members 36 and 38, made of metal for example.

As shown in the drawings, conductive wires 22 include two conductive wires 40 and 42 in electrical connection with the plate-like resistor 30 at the connection points 44 and 46 secured on the opposite surfaces thereof, for example, by soldering (wire 40) to a circular electrically conductive contact plate, illustrated at 47 in FIG. 3. (The top contact plate 47 and the corresponding bottom plate are not shown in FIG. 4 for the sake of clarity.) The insulating plates 32 and 34 are then attached to the plate-like resistor 30 and encased by the casing members 36 and 38. The casing members 36 and 38 have respective openings 48 and 50 to allow the conductive wires 40, 42 to pass therethrough.

Since the positive temperature coefficient resistor (30) is quickly responsive to temperature variations and the heat generated thereby is automatically adjustable in response to the temperature variations it is reliable and safe in operation. The plate-like resistor 30 of the present invention can be set to a desired temperature range so that when the upper temperature level of that range is reached, the heating device 12 stops generating heat until the temperature drops down below the desired lower temperature level which causes the heating device to generate heat again. The temperature of the heating device 12 is thus maintained within the desired temperature range. In heating or cooking food, it is preferable to set the temperature level to be 100° Celsius. With such a setting, overheating or overcooking food can be avoided and the potential risk of fire thereby eliminated.

It is apparent that although the invention has been described in connection with the preferred embodiment, it is contemplated that those skilled in the art may make changes to certain features thereof without altering the basic concept of the invention and without departing from the spirit and scope of the invention as defined in the appended claims.

I claim:

1. An electrically-heated spoon comprising:
   a generally flat electrical heating device forming a flat bottom of a bowl of a spoon, said heating device comprising a positive temperature coefficient resistor assembly, said assembly including a positive temperature coefficient flat resistor plate, a pair of insulating plates between which said flat resistor plate is sandwiched, and heat conductive casing members encasing said insulating plates, said casing members having at least one casing member opening;
   a sidewall mounted to a periphery of said heating device and forming a bowl sidewall of the bowl;
   a handle attached to said sidewall and forming a spoon handle of the spoon, said handle having a remote handle end; and
   conductive wiring electrically connected to said flat resistor plate, passing out said at least one casing member opening, through said handle and out said remote handle end for connection to an external power source.

2. The electrically-heated spoon of claim 1 wherein said sidewall and handle comprise a unitarily formed unit.

3. The electrically-heated spoon of claim 1 further comprising a connecting plug to which said wiring passing out of said handle remote end is connected.

4. The electrically-heated spoon of claim 3 further comprising an electrical power socket to which said connecting plug is electrically engageable.

5. The electrically-heated spoon of claim 1 wherein the flat bottom has a lowermost surface and said sidewall extends a distance below the lowermost surface.

6. The electrically-heated spoon of claim 1 wherein said sidewall includes a C-shaped section around and abut the periphery of the flat bottom.

7. The electrically-heated spoon of claim 1 wherein said sidewall and said handle are injection molded.

8. The electrically-heated spoon of claim 1 wherein said casing members are constructed of metal.

9. The electrically-heated spoon of claim 1 wherein said resistor plate is made of BaT103.

10. The electrically-heated spoon of claim 1 wherein said wiring includes a first wire mounted to a top of said resistor plate and a second wire mounted to a bottom of said resistor plate.

11. The electrically-heated spoon of claim 10 wherein said first wire is soldered to said resistor plate top and said second wire is soldered to said resistor plate bottom.

12. The electrically-heated spoon of claim 1 wherein said wiring in said handle is generally rigid and said generally rigid wiring is embedded in said handle.

13. The electrically-heated spoon of claim 1 wherein said sidewall and said handle are formed of a temperature resistive and electrical insulating material.

14. The electrically-heated spoon of claim 13 wherein the material is a temperature resistive plastic.

15. The electrically-heated spoon of claim 1 wherein said plate includes an outer contact plate and said wiring includes a wire electrically secured to said contact plate.

16. The electrically-heated spoon of claim 15 wherein said contact plate comprises a round top plate and said wire is soldered thereto to provide the electrical securement.

* * * * *